United States Patent
Chen et al.

(10) Patent No.: US 12,035,268 B2
(45) Date of Patent: Jul. 9, 2024

(54) METHOD FOR OBTAINING TIMING ADVANCE AND APPARATUS

(71) Applicant: HUAWEI TECHNOLOGIES CO., LTD., Guangdong (CN)

(72) Inventors: Lei Chen, Beijing (CN); Bingzhao Li, Beijing (CN); Hong Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 326 days.

(21) Appl. No.: 17/514,200

(22) Filed: Oct. 29, 2021

(65) Prior Publication Data

US 2022/0053437 A1 Feb. 17, 2022

Related U.S. Application Data

(63) Continuation of application No. PCT/CN2020/078964, filed on Mar. 12, 2020.

(30) Foreign Application Priority Data

Apr. 30, 2019 (CN) .......................... 201910361638.0

(51) Int. Cl.
  *H04W 56/00* (2009.01)
  *G01S 5/00* (2006.01)
  *H04W 24/10* (2009.01)
(52) U.S. Cl.
  CPC ......... *H04W 56/005* (2013.01); *G01S 5/0063* (2013.01); *H04W 24/10* (2013.01); *H04W 56/006* (2013.01)
(58) Field of Classification Search
  CPC . H04W 56/005; H04W 56/006; H04W 24/10; G01S 5/0063

(Continued)

(56) References Cited

U.S. PATENT DOCUMENTS

2014/0295884 A1* 10/2014 Racz ................. H04W 24/10
455/456.1
2015/0327198 A1 11/2015 Axmon et al.
(Continued)

FOREIGN PATENT DOCUMENTS

CN    102281626 A    12/2011
CN    102740443 A    10/2012
(Continued)

OTHER PUBLICATIONS

Renesas Mobile Europe, Discussion on RACH based solution and Timing difference based solution. 3GPP TSG-RAN WG2 Meeting #74, Barcelona, Spain, May 9-13, 2011, R2-113015, 4 pages.
(Continued)

*Primary Examiner* — Peter G Solinsky
(74) *Attorney, Agent, or Firm* — WOMBLE BOND DICKINSON (US) LLP

(57) ABSTRACT

The application provides a method for obtaining a timing advance (TA) and an apparatus. A terminal device receives first time information broadcast by a first cell, and second time information broadcast by a neighbor cell. The terminal device obtains a TA from the terminal device to the neighbor cell based on the following information: a time point indicated by the first time information, a TA from the terminal device to the first cell, a time difference between receiving of the first time information and receiving of the second time information, and a time point indicated by the second time information..

14 Claims, 8 Drawing Sheets

(58) Field of Classification Search
USPC .......................................................... 370/503
See application file for complete search history.

(56) References Cited

U.S. PATENT DOCUMENTS

| | | | | |
|---|---|---|---|---|
| 2019/0200320 | A1* | 6/2019 | Selvaganapathy | .... H04W 64/00 |
| 2019/0215864 | A1* | 7/2019 | Yang | ...................... H04W 74/02 |
| 2020/0169960 | A1* | 5/2020 | Dinan | ................... H04W 52/40 |
| 2020/0204319 | A1* | 6/2020 | Dinan | ..................... H04L 5/005 |
| 2020/0314788 | A1* | 10/2020 | Yu | ...................... H04W 56/0065 |
| 2021/0243817 | A1* | 8/2021 | Beale | .................. H04W 56/004 |
| 2022/0060997 | A1* | 2/2022 | Dinan | ................... H04L 27/18 |
| 2022/0418002 | A1* | 12/2022 | Dinan | ..................... H04W 52/22 |

FOREIGN PATENT DOCUMENTS

| | | |
|---|---|---|
| CN | 104640148 A | 5/2015 |
| CN | 106470413 A | 3/2017 |
| CN | 109526001 A | 3/2019 |
| EP | 2557867 A1 | 2/2013 |
| EP | 2693826 A1 | 2/2014 |
| EP | 3982678 A2 * | 4/2022 ............ H04L 5/001 |
| WO | 2011085660 A1 | 7/2011 |
| WO | 2013026349 A1 | 2/2013 |
| WO | 2014027942 A1 | 2/2014 |
| WO | 2014067475 A1 | 5/2014 |
| WO | 2018084797 A1 | 5/2018 |
| WO | WO-2018084778 A1 * | 5/2018 ............... G01S 5/14 |
| WO | 2018136224 A2 | 7/2018 |

OTHER PUBLICATIONS

InterDigital Communications, LLC, Discussion on Timing Advance calculation using time difference measurement. 3GPP TSG-RAN WG1 Meeting #66, Athens, Greece, Aug. 22-26, 2011, R1-112234, 6 pages.

* cited by examiner

METHOD FOR OBTAINING TIMING ADVANCE AND APPARATUS

CROSS-REFERENCE TO RELATED APPLICATIONS

This application is a continuation of International Application No. PCT/CN2020/078964, filed on Mar. 12, 2020, which claims priority to Chinese Patent Application No. 201910361638.0, filed on Apr. 30, 2019. The disclosures of the aforementioned applications are hereby incorporated by reference in their entireties.

TECHNICAL FIELD

The application relates to the communication field, and more specifically, to a method for obtaining a timing advance (TA) and an apparatus.

BACKGROUND

Currently, a new method for positioning a terminal device is proposed. To be specific, the terminal device is positioned based on distances from the terminal device to a plurality of base stations and geographical locations of the plurality of base stations. In this positioning method, the distance between the terminal device and each base station needs to be learned.

Based on a transmission characteristic of an electromagnetic wave, the distance between the terminal device and the base station is equal to a product of the speed of light and transmission duration of the electromagnetic wave between the terminal device and the base station. There is a timing advance (TA) mechanism in an existing technology. TA indicates a period of time, which is approximately equal to round-trip time of the electromagnetic wave between the terminal device and the base station. Therefore, the distance from the terminal device to the base station may be calculated by using the TA from the terminal device to the base station, and is equal to 1/2*TA*speed of light.

In the foregoing positioning method, a base station participating in positioning of the terminal device may be a base station in a serving cell in which the terminal device is located, namely, a serving base station, may be a base station in a neighbor cell of the terminal device, namely, a base station of the neighbor cell, or may include both a serving base station and a base station of the neighbor cell. Therefore, to position the terminal device, both a TA from the terminal device to the serving base station and a TA from the terminal device to the base station of the neighbor cell need to be learned.

Currently, in the existing technology, there is only a solution for obtaining the TA from the terminal device to the serving base station, but there is no solution for obtaining the TA from the terminal device to the base station of the neighbor cell.

Therefore, to position the terminal device, a solution for obtaining the TA from the terminal device to the base station of the neighbor cell needs to be proposed.

SUMMARY

The application provides a method for obtaining a timing advance (TA) and an apparatus, to obtain a TA from a terminal device to a neighbor cell.

In at least one embodiment, a method for obtaining a timing advance TA is provided. The method includes: receiving, by a terminal device, first time information broadcast by a first cell, and receiving second time information broadcast by a neighbor cell; and obtaining a TA from the terminal device to the neighbor cell based on the following information: a time point indicated by the first time information, a TA from the terminal device to the first cell, a time difference between receiving of the first time information and receiving of the second time information, and a time point indicated by the second time information.

The first time information is time information that is broadcast by the first cell and used for timing. The second time information is time information that is broadcast by the neighbor cell and used for timing.

The first cell is a serving cell of the terminal device, or is a neighbor cell whose TA has been learned of by the terminal device in advance. In conclusion, the first cell indicates a cell whose TA can be learned of by the terminal device, or a cell whose TA has been learned of by the terminal device in advance.

For example, a process of obtaining the TA from the terminal device to the neighbor cell includes: (1) Obtain, based on the TA from the terminal device to the first cell and the time point indicated by the first time information, an absolute time point at which the first time information is received. (2) Calculate, based on the absolute time point at which the first time information is received and the time difference between receiving of the first time information and receiving of the second time information, an absolute time point at which the second time information is received. (3) Calculate the TA from the terminal device to the neighbor cell based on the absolute time point at which the second time information is received and the time point indicated by the second time information.

In an embodiment, the time information of the first cell and neighbor cell is received, and the TA from the terminal device to the neighbor cell may be obtained through calculation based on the TA from the terminal device to the first cell and the received time information.

It should be understood that, in a scenario in which the terminal device is positioned based on distances from the terminal device to a plurality of base stations and geographical locations of the plurality of base stations, if the base stations participating in positioning include a base station of the neighbor cell, the solution provided in the application is used to learn of a TA from the terminal device to the base station of the neighbor cell, so that a distance from the terminal device to the base station of the neighbor cell may be learned of, and the terminal device may be positioned.

In addition, according to the application, the TA from the terminal device to the neighbor cell can be easily calculated without introducing a new physical quantity. This is a solution with a relatively wide application range.

In at least one embodiment, the receiving second time information broadcast by a neighbor cell includes: receiving positioning assistance information from the serving cell or a location management device, where the positioning assistance information includes time configuration information of the neighbor cell, and the time configuration information is used to indicate a time-frequency resource used by the neighbor cell to broadcast the time information; and receiving, based on the time configuration information, the second time information broadcast by the neighbor cell.

In an embodiment, time configuration information of a cell is used to indicate a time-frequency resource used by the cell to broadcast the time information. For example, the time configuration information of the cell includes time domain resource configuration information and frequency domain resource configuration information. For example, the time configuration information of the cell includes any one or more of the following: a broadcast periodicity, a broadcast window position, a frequency domain resource position, or the like.

It should be understood that the terminal device does not establish a communication connection to the neighbor cell. Therefore, the time configuration information of the neighbor cell is delivered to the terminal device, to help the terminal device receive the time information broadcast by the neighbor cell.

In at least one embodiment, the method further includes: sending, to the serving cell, a request message used to request a measurement gap; and receiving measurement gap configuration information from the serving cell, where a measurement gap indicated by the measurement gap configuration information covers a time domain position at which the neighbor cell broadcasts the time information; and the receiving second time information broadcast by a neighbor cell includes: receiving, within the measurement gap indicated by the measurement gap configuration information, the second time information broadcast by the neighbor cell.

In an embodiment, after the terminal device receives the time configuration information of the neighbor cell, if a measurement gap configured by a current serving cell for the terminal device may cover the time domain position indicated by the time configuration information of the neighbor cell, the terminal device does not need to request a new measurement gap from a serving base station, and may directly receive, based on the current measurement gap, the time information broadcast by the neighbor cell.

It should be understood that if the neighbor cell and the serving cell are on a same frequency, the terminal device does not need to receive, by using the measurement gap, the time information broadcast by the neighbor cell. In this case, the serving base station does not need to be requested to configure the measurement gap configuration information either.

In at least one embodiment, a method for obtaining a timing advance TA is provided. The method includes: A serving cell or a location management device obtains time configuration information of a neighbor cell from the neighbor cell, where the time configuration information is used to indicate a time-frequency resource used by the neighbor cell to broadcast time information. The serving cell or the location management device sends the time configuration information of the neighbor cell to a terminal device.

For example, the time configuration information of the neighbor cell includes time domain resource configuration information and frequency domain resource configuration information. For example, the time configuration information includes any one or more of the following: a broadcast periodicity, a broadcast window position, a frequency domain resource position, or the like.

In at least one embodiment, the serving cell or the location management device sends the time configuration information of the neighbor cell to the terminal device to help the terminal device receive the time information broadcast by the neighbor cell, and then obtain a TA from the terminal device to the neighbor cell.

In at least one embodiment The serving cell or the location management device requests the neighbor cell to provide the time configuration information of the neighbor cell.

In at least one embodiment, the method is performed by the serving cell, and a base station of the serving cell includes a component having a location management function.

In at least one embodiment, the method for obtaining a timing advance TA is performed by the serving cell. The serving cell receives a measurement gap request message sent by the terminal device, where the measurement gap request message is used to request a measurement gap covering a time domain position at which the time information of the neighbor cell is broadcast; and send measurement gap configuration information to the terminal device, where a measurement gap indicated by the measurement gap configuration information covers the time domain position at which the time information of the neighbor cell is broadcast.

In at least one embodiment, a method for obtaining a timing advance TA is provided. A neighbor cell sends time configuration information of the neighbor cell to a serving cell or a location management device, where the time configuration information is used to indicate a time-frequency resource used by the neighbor cell to broadcast time information. The neighbor cell broadcasts the time information based on the time configuration information.

In at least one embodiment, the neighbor cell sends the time configuration information of the neighbor cell to the serving cell or the location management device, so that the serving cell or the location management device sends the time configuration information of the neighbor cell to a terminal device, to help the terminal device receive the time information broadcast by the neighbor cell, and then obtain a TA from the terminal device to the neighbor cell.

In at least one embodiment, the neighbor cell sends the time configuration information of the neighbor cell to the serving cell or the location management device based on a request of the serving cell or location management device.

In at least one embodiment A neighbor cell receives preamble configuration information, where the preamble configuration information indicates a time-frequency resource used by a terminal device to send a preamble; receives, based on the preamble configuration information, the preamble sent by the terminal device; and measures the received preamble, and obtains a TA from the terminal device to the neighbor cell based on a measurement result and a frame boundary time difference between the neighbor cell and a serving cell.

In at least one embodiment the neighbor cell receives the preamble configuration information from the serving cell or a location management device.

In at least one embodiment the neighbor cell receives the frame boundary time difference between the neighbor cell and the serving cell from the serving cell or the location management device.

In at least one embodiment, the neighbor cell may alternatively independently obtain the frame boundary time difference between the neighbor cell and the serving cell.

In at least one embodiment, the serving cell sends the preamble configuration information to the terminal device and the neighbor cell, so that the neighbor cell may obtain the TA from the terminal device to the neighbor cell by receiving and measuring the preamble sent by the terminal device.

In at least one embodiment A serving cell allocates preamble configuration information to a terminal device. The serving cell sends the preamble configuration information to a neighbor cell.

In at least one embodiment, the serving cell sends to the neighbor cell the preamble configuration information configured for the terminal device to help the neighbor cell receive a preamble sent by the terminal device, so that the neighbor cell obtains a TA from the terminal device to the neighbor cell by measuring the preamble.

In at least one embodiment, the serving cell does not include a component having a location management function, and sends the preamble configuration information to a neighbor cell. The serving cell sends the preamble configuration information to the neighbor cell by using a location management device.

In at least one embodiment, the serving cell receives an indication message of the location management device, where the indication message is used to indicate that the TA from the terminal device to the neighbor cell needs to be calculated.

In at least one embodiment, a communication apparatus is provided. The communication apparatus is configured to perform the methods for obtaining a timing advance TA as described herein.

In at least one embodiment, the communication apparatus includes a module configured to perform the method for obtaining a timing advance TA as described herein.

In at least one embodiment, a communication apparatus is provided. The communication apparatus includes a memory and a processor. The memory is configured to store instructions. The processor is configured to execute the instructions stored in the memory, and execution of the instructions stored in the memory enables the processor to perform the methods for obtaining a timing advance TA as described herein.

In at least one embodiment, a chip is provided. The chip includes a processing module and a communication interface. The processing module is configured to control the communication interface to communicate with the outside, and the processing module is further configured to perform the methods for obtaining a timing advance TA as described herein.

In at least one embodiment, a computer-readable storage medium is provided. The computer-readable storage medium stores a computer program. When the computer program is executed by a computer, the computer is enabled to perform the methods for obtaining a timing advance TA as described herein.

In at least one embodiment, a computer program product including instructions is provided. When the instructions are executed by a computer, the computer is enabled to perform the methods for obtaining a timing advance TA as described herein.

In at least one embodiment, a positioning system is provided. The positioning system includes the communication apparatus as described herein and configured to perform the methods as described herein.

In at least one embodiment, the communication apparatus is referred to as a terminal device. In at least one embodiment, the communication apparatus is referred to as a serving cell or a location management device. In at least one embodiment, the communication apparatus is referred to as a neighbor cell.

In at least one embodiment, a positioning system is provided. The positioning system includes a terminal device, and communication apparatuses that are configured to perform the methods as described herein.

In at least one embodiment, the communication apparatus is referred to as a network device in a neighbor cell, for example, referred to as a base station of the neighbor cell. In at least one embodiment, the communication apparatus is referred to as a network device in a serving cell, for example, referred to as a serving base station.

In at least one embodiment, the positioning system includes a location management device.

Based on the foregoing descriptions, according to the method for obtaining a timing advance (TA) and the apparatus that are provided in the application, the TA from the terminal device to the neighbor cell can be obtained. The solutions provided in the application may be applied to an application scenario in which a terminal device is positioned based on distances from the terminal device to a plurality of base stations, and may also be applied to another application scenario in which a TA from the terminal device to a base station of the neighbor cell needs to be obtained.

DESCRIPTION OF EMBODIMENTS

The following describes technical solutions of the application with reference to the accompanying drawings.

Unless otherwise defined, all technical and scientific terms used in the application have the same meanings as those commonly understood by one of ordinary skill in the art of the application. Terms used in this specification are merely intended to describe specific embodiments, but are not intended to limit the application.

Figure 1:
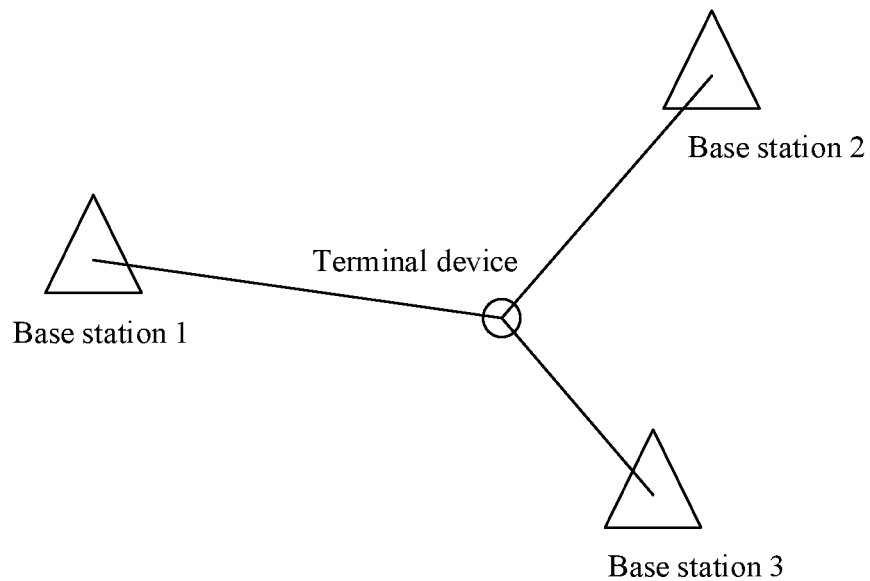
FIG. 1 is a schematic diagram of an application scenario according to an embodiment of the application.

FIG. 1 is a schematic diagram of an application scenario according to an embodiment of the application. As shown in FIG. 1, a positioning principle is described. In an embodiment, a terminal device is positioned based on distances from the terminal device to a plurality of base stations (where FIG. 1 schematically shows three base stations) and geographical locations of the base stations.

In a positioning solution shown in FIG. 1, a plurality of base stations (at least three base stations) participating in positioning of the terminal device may all be serving base stations, or may all be base stations of a neighbor cell, or may include both a serving base station and a base station of a neighbor cell. For example, the base stations participating in positioning of the terminal device include one serving base station and two base stations of the neighbor cell.

As described above, a distance from the terminal device to a base station may be obtained by using a TA from the terminal device to the base station, that is, equal to 1/2*TA*speed of light. According to this guideline, to implement the positioning solution shown in FIG. 1, a TA from the terminal device to the serving base station may need to be obtained, or a TA from the terminal device to a base station of the neighbor cell may need to be obtained.

In an existing technology, there is only a solution for obtaining the TA from the terminal device to the serving base station, but there is no solution for obtaining the TA from the terminal device to the base station of the neighbor cell.

To solve the foregoing problem, the application provides a solution for obtaining the TA from the terminal device to the base station of the neighbor cell. The solution can implement the positioning solution for the terminal device shown in FIG. 1, or satisfy a requirement of another application scenario in which the TA from the terminal device to the base station of the neighbor cell needs to be obtained.

The technical solutions provided in the embodiments of the application may be applied to various communication systems, for example, a long term evolution (LTE) system, a fifth generation (5th Generation, 5G) mobile communication system, a new radio (NR) system, a machine-to-machine (M2M) communication system, another future evolved communication system, or the like.

Figure 2:
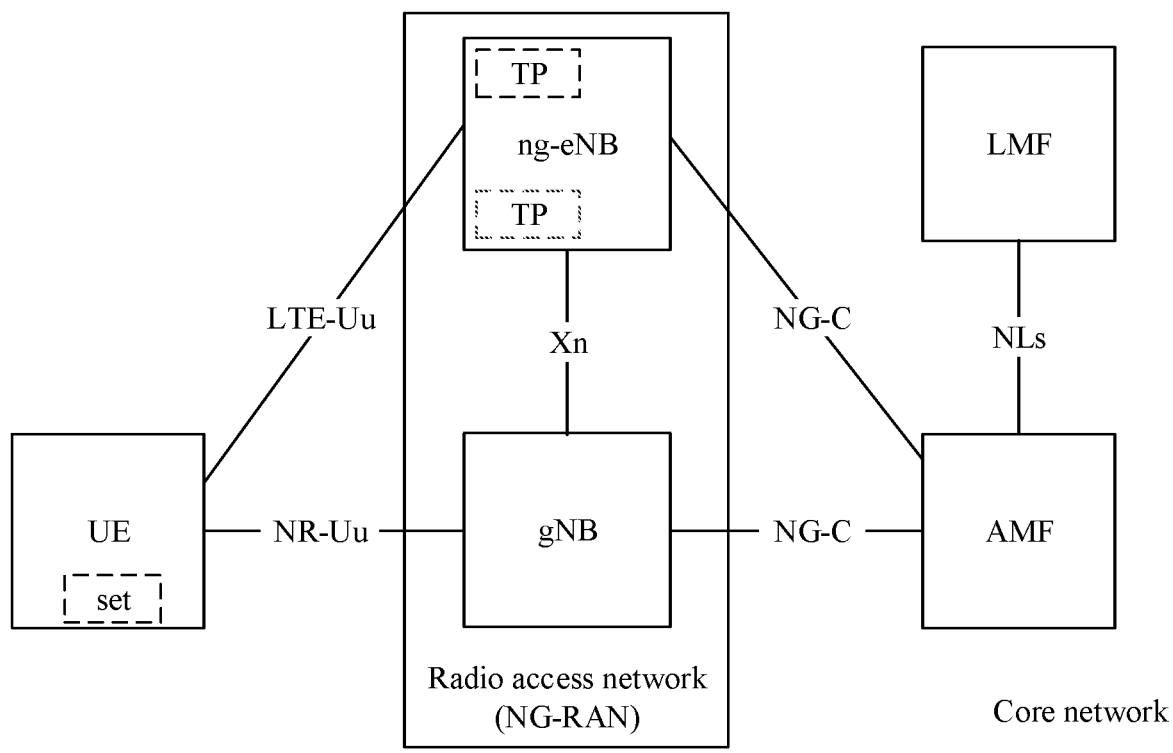
FIG. 2 and FIG. 3 are each a schematic diagram of a communication architecture according to an embodiment of the application.
Figure 3:
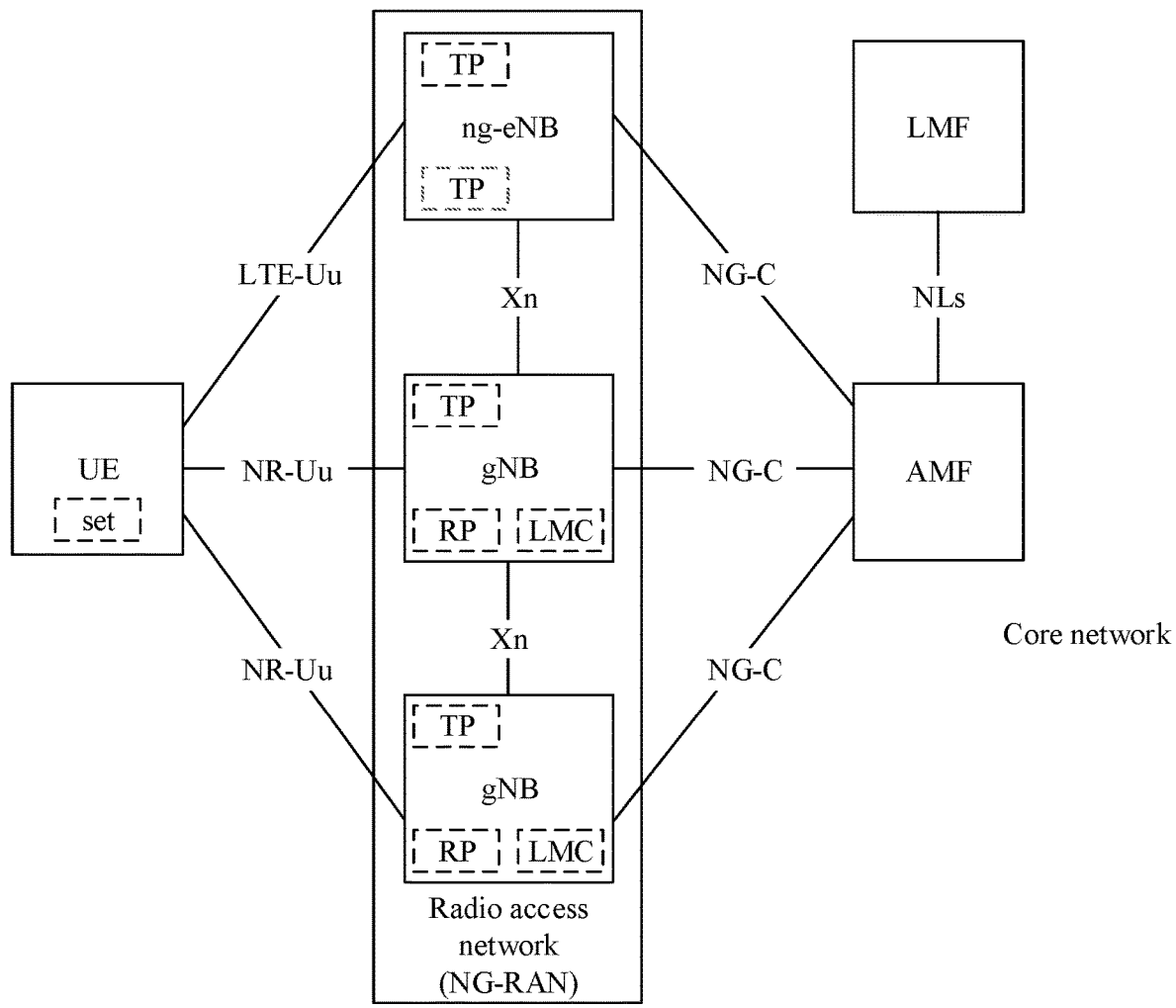

FIG. 2 and FIG. 3 are each a schematic architectural diagram of a communication system according to the application.

As shown in FIG. 2, the communication system in the application may include a terminal device (represented as UE in FIG. 2), a radio access network (NG-RAN), and a core network.

The core network includes an access and mobility management function (AMF), a location management function (LMF), and the like. The AMF functions as a gateway and the like, and the LMF functions as a positioning center and the like. The AMF and LMF are connected through an NLs interface.

The radio access network (NG-RAN) includes one or more ng-eNBs and gNBs. A ng-eNB indicates an LTE base station that accesses a 5G core network, and a gNB indicates a 5G base station that accesses the 5G core network.

A ng-eNB and a gNB, two ng-eNBs, or two gNBs communicate with each other through an Xn interface. The Xn interface may also be referred to as an XnAP interface.

The radio access network is connected to the core network via the AMF through an NG-C interface.

The terminal device is connected to the radio access network via the ng-eNB through an LTE-Uu interface. The terminal device may be alternatively connected to the radio access network via the gNB through an NR-Uu interface.

The core network may communicate with the terminal device by using an LPP/NPP protocol.

It should be understood that the communication system may include one or more base stations (e.g., ng-eNBs and/or gNBs).

It should be further understood that the communication system may include one or more terminal devices, for example, one or more terminal device sets (for example, a UE set shown in FIG. 2).

One gNB may send data or control signaling to one or more terminal devices. A plurality of gNBs may send data or control signaling to one terminal device.

Alternatively, the ng-eNB in FIG. 2 may be replaced with a transmission point (TP) (for example, a TP shown in FIG. 2).

As shown in FIG. 3, the communication system in the application may include a terminal device (represented as UE in FIG. 3), a radio access network (NG-RAN), and a core network.

The core network includes functions such as an AMF and an LMF. The AMF functions as a gateway and the like, and the LMF functions as a positioning center and the like. The AMF and LMF are connected through an NLs interface.

The radio access network (NG-RAN) includes one or more ng-eNBs and gNBs. A ng-eNB indicates an LTE base station that accesses a 5G core network, and a gNB indicates a 5G base station that accesses the 5G core network.

The gNB includes a location management component (LMC), and the LMC may perform some functions of the LMF. In this case, to perform the LMF functions that can be implemented by the LMC, the radio access network does not need to access the 5G core network via the AMF. Therefore, a signaling delay can be reduced.

It should be understood that the communication architecture may include one or more base stations (including the ng-eNB and the gNB).

It should be further understood that the communication architecture may include one or more terminal devices, for example, one or more terminal device sets (for example, a UE set shown in FIG. 3).

One gNB may send data or control signaling to one or more terminal devices. A plurality of gNBs may send data or control signaling to one terminal device.

A terminal device in the embodiments of the application may be user equipment (UE), an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like.

A network device in the embodiments of the application may be configured to communicate with one or more terminal devices, or may be configured to communicate with one or more base stations having some terminal functions (for example, communication between a macro base station and a micro base station, such as an access point). The base station may be an evolved NodeB (evolved NodeB, eNB) in an LTE system, or a gNB (gNB) in a 5G system or an NR system. In addition, the base station may alternatively be an access point (AP), a transmission point (TRP), a central unit (CU), or another network entity, and may include some or all of functions of the foregoing network entities. For example, the network device in the embodiments of the application may be corresponding to an access network device in the communication architectures shown in FIG. 2 and FIG. 3.

A location management device in the embodiments of the application indicates a core network device, for example, the LMF shown in FIG. 2, that has a location management function. Alternatively, a location management device indicates an apparatus, for example, the LMC shown in FIG. 3, that has a location management function and that can be disposed in an access network device.

It should be further noted that in the application, two descriptions of "cell" and "base station in the cell" are equivalent. That is, a cell mentioned in the application indicates a base station in the cell, and a base station mentioned in the application also indicates a cell in which the base station is located. For example, a serving cell mentioned in the application may also indicate a base station in the serving cell, namely, a serving base station. A neighbor cell mentioned in the application may also indicate a base station in the neighbor cell, namely, a base station of the neighbor cell.

To better understand the solutions provided in the application, the terms in the embodiments of the application are first described.

1. Timing Advance (TA)

To ensure orthogonality of uplink transmission and avoid intra-cell interference, a base station (for example, an eNodeB) requires that signals from different terminal devices in a same subframe but on different frequency domain resources arrive at the base station at substantially the same time, that is, the base station requires uplink time synchronization. As long as the base station receives, within a cyclic prefix (CP) range, uplink data sent by a terminal device, the base station can correctly decode the uplink data. Therefore, the uplink time synchronization requires that time points at which the signals from the different terminal devices in the same subframe arrive at the base station fall within a CP. To ensure uplink time synchronization on a base station side, an uplink timing advance (TA) mechanism is proposed in LTE. TA represents a period of time, and is approximately round-trip time of transmission of an electromagnetic wave between a terminal device and a base station. A plurality of terminal devices send uplink data to a same base station based on TAs from the plurality of terminal devices to the base station, so that signals from the plurality of terminal devices arrive at the base station at substantially the same time.

In an existing technology, the TA mechanism is applicable to a terminal device and a base station serving the terminal device.

A serving cell may calculate a TA from the terminal device to the serving cell based on a preamble sent by the terminal device to the serving cell. The serving cell configures the TA from the terminal device to the serving cell on the terminal device, so that the terminal device performs uplink sending based on the TA.

2. Broadcast Timing

Broadcast timing is a timing manner in which a terminal device reads time information in system information broadcast by a serving cell and determines a current time point in combination with the TA from the terminal device to the serving cell. A basic principle is shown in FIG. 4.

Figure 4:
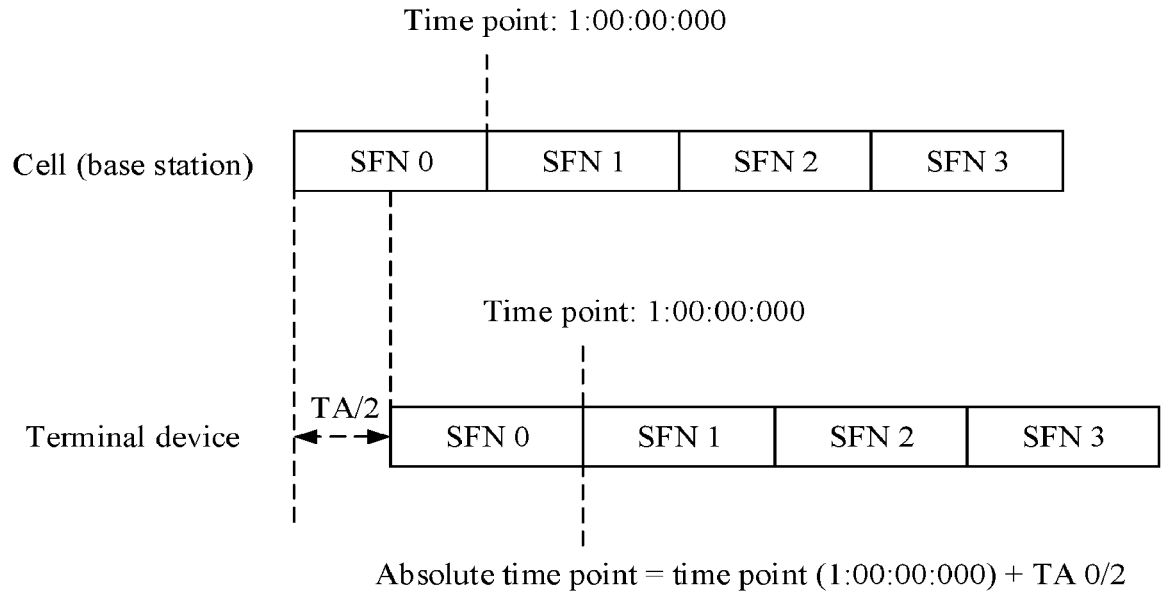
FIG. 4 is a schematic diagram of a broadcast timing information mechanism according to an embodiment of the application.

The serving cell periodically broadcasts time-related system information in a frame (for example, an SFN 0 in FIG. 4). The system information includes a time value (for example, a time point 1:00:00:000 shown in FIG. 4), and the time value may be associated with a boundary of the frame. After receiving the system information, the terminal device obtains the time value through parsing, and adds 1/2*TA to a time point represented by the time value to obtain an absolute time point of the frame boundary associated with the time value. TA is a timing advance from the terminal device to the serving cell.

Figure 5:
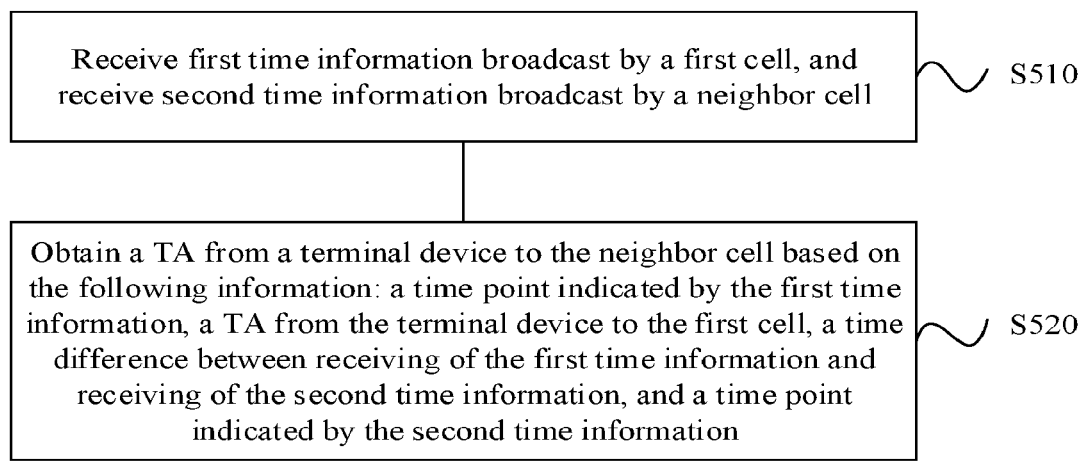
FIG. 5 is a schematic flowchart of a method for obtaining a TA according to an embodiment of the application.

FIG. 5 is a schematic flowchart of a method 500 for obtaining a timing advance TA according to an embodiment of the application. The method 500 may be performed by a terminal device, or may be performed by a component, such as a chip or a circuit, disposed in the terminal device. The method 500 includes the following operations.

S510: Receive first time information broadcast by a first cell, and receive second time information broadcast by a neighbor cell.

The first time information is time information that is broadcast by the first cell and used for timing. The second time information is time information that is broadcast by the neighbor cell and used for timing.

For example, the first time information or the second time information indicates a time value, for example, a time point 1:00:00:000 shown in FIG. 4.

For example, a manner in which a terminal device receives the first time information may include: The terminal device receives system information broadcast by the first cell, and parses the system information to obtain the first time information. A manner in which the terminal device receives the second time information may include: The terminal device receives system information broadcast by the neighbor cell, and parses the system information to obtain the second time information.

A sequence of receiving of the first time information and receiving of the second time information is not limited in the application.

The first cell in this embodiment of the application may be a serving cell of the terminal device, or may be a neighbor cell whose TA has been learned of by the terminal device in advance. In conclusion, the first cell indicates a cell whose TA can be learned of by the terminal device, or a cell whose TA has been learned of by the terminal device in advance.

The neighbor cell in this embodiment of the application indicates a neighbor cell, where a TA between the neighbor cell and the terminal device is to be determined.

S520: Obtain a TA from the terminal device to the neighbor cell based on the following information: a time point indicated by the first time information, a TA from the terminal device to the first cell, a time difference between receiving of the first time information and receiving of the second time information, and a time point indicated by the second time information.

A process of obtaining the TA from the terminal device to the neighbor cell may include: (1) Obtain, based on the TA from the terminal device to the first cell and the time point indicated by the first time information, an absolute time point at which the first time information is received. (2) Calculate, based on the absolute time point at which the first time information is received and the time difference between receiving of the first time information and receiving of the second time information, an absolute time point at which the second time information is received. (3) Calculate the TA from the terminal device to the neighbor cell based on the absolute time point at which the second time information is received and the time point indicated by the second time information.

Figure 6:
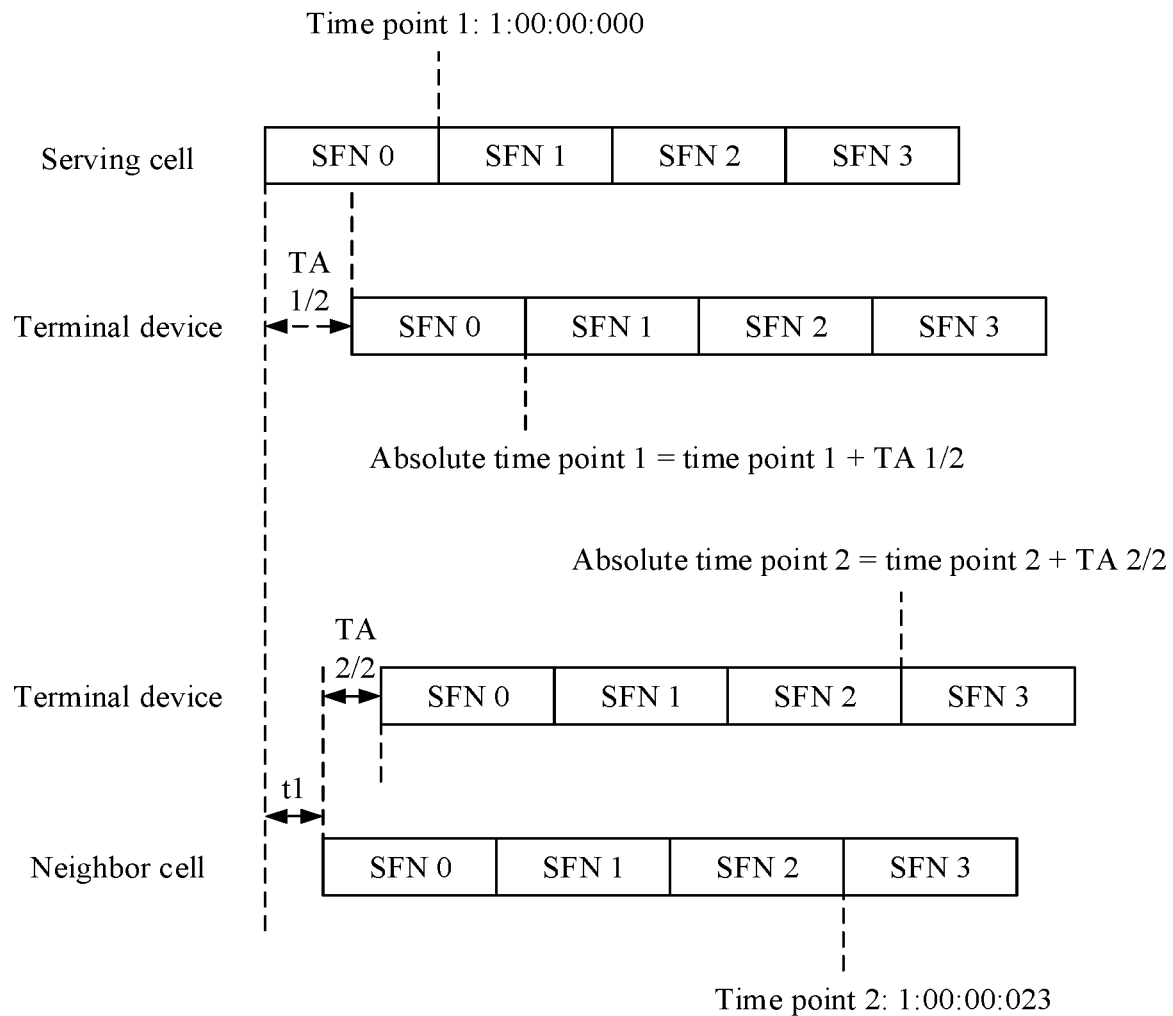
FIG. 6 is a schematic diagram of a method for obtaining a TA of a neighbor cell based on a broadcast timing information mechanism according to an embodiment of the application.

FIG. 6 is an example of the foregoing process of obtaining the TA from the terminal device to the neighbor cell. In FIG. 6, it is assumed that the first cell is the serving cell. The terminal device receives the first time information broadcast by the serving cell, and reads a first time point (for example, a time point 1 shown in FIG. 6, 1:00:00:000); and receives the second time information broadcast by the neighbor cell, and reads a second time point (for example, a time point 2 shown in FIG. 6, 1:00:00:0023). The terminal device obtains an absolute time point 1 (for example, absolute time point 1=time point 1+TA 1/2 shown in FIG. 6) by using the first time point and a timing advance from the terminal device to the serving cell (for example, a TA 1 shown in FIG. 6). Theoretically, an absolute time point (denoted as an absolute time point 2) (for example, absolute time point 2=time point 2+TA 2/2 shown in FIG. 6) may also be obtained by using a second time point and a timing advance (for example, a TA 2 shown in FIG. 6) from the terminal device to the neighbor cell.

Because the absolute time point is constant, the timing advance TA 2 from the terminal device to the neighbor cell may be calculated based on the following formula:

$$T1'+\Delta t=T2'=T2+1/2*TA\ 2,$$

where T1' indicates the absolute time point 1, Δt indicates the time difference between receiving of the first time information by the terminal device and receiving of the second time information by the terminal device, T2' indicates the absolute time 2, and T2 indicates the second time.

According to the application, the time information of the first cell and neighbor cell is received, and the TA from the terminal device to the neighbor cell may be obtained through calculation based on the TA from the terminal device to the first cell and the received time information.

In the positioning scenario shown in FIG. 1, if the base stations participating in positioning include a base station of the neighbor cell, the solution provided in the application is used to learn of a TA from the terminal device to the base station of the neighbor cell, so that a distance from the terminal device to the base station of the neighbor cell may be learned of, and the terminal device may be positioned.

In addition, according to the application, the TA from the terminal device to the neighbor cell can be easily calculated without introducing a new physical quantity. This is a solution with a relatively wide application range.

In operation S510, the terminal device receives, based on time configuration information of the first cell, the first time information broadcast by the first cell, and receives, based on time configuration information of the neighbor cell, the second time information broadcast by the neighbor cell.

time configuration information of a cell is used to indicate a time-frequency resource used by the cell to broadcast time information. That is, the terminal device receives, on the time-frequency resource indicated by the time configuration information, the time information broadcast by the cell.

The terminal device should know time configuration information of the serving cell. For example, in a process of accessing the serving cell, the terminal device receives the time configuration information configured by the serving cell.

A serving base station or a location management device delivers the time configuration information of the neighbor cell to the terminal device.

When the serving base station does not include a component performing a location management function (where for example, the serving base station is the gNB shown in FIG. 2), a location management device (for example, the LMF shown in FIG. 2) in a core network may collect the time configuration information of the neighbor cell, and send the time configuration information of the neighbor cell to the terminal device.

When the serving base station includes a component performing a location management function (where for example, the serving base station is the gNB shown in FIG. 3), the serving base station may collect the time configuration information of the neighbor cell, and send the time configuration information of the neighbor cell to the terminal device.

It should be understood that, when the serving base station includes the component performing the location management function, a location management device in a core network may alternatively collect the time configuration information of the neighbor cell, and send the time configuration information of the neighbor cell to the terminal device.

It should be noted that, when sending time configuration information of a plurality of neighbor cells to the terminal device, a network side (e.g., the serving base station or the location management device) should send cell identifiers (IDs) of the corresponding cells while sending the time configuration information of the neighbor cells.

In an embodiment, the method 500 further includes: receiving positioning assistance information from the serving cell or the location management device, where the positioning assistance information includes the time configuration information of the neighbor cell.

For example, the positioning assistance information includes time configuration information of a plurality of neighbor cells and cell IDs of the corresponding neighbor cells.

In the foregoing embodiment related to the time configuration information, time configuration information of a cell is used to indicate a time-frequency resource used by the cell to broadcast time information.

For example, the time configuration information of the cell includes time domain resource configuration information and frequency domain resource configuration information.

For example, the time configuration information of the cell includes any one or more of the following information: a broadcast periodicity, a broadcast window position, a frequency domain resource position, or the like.

It should be understood that, after receiving the time configuration information of the neighbor cell from the network side, the terminal device may locally cache the time configuration information, and may repeatedly use the time configuration information in a subsequent process of receiving the time information broadcast by the neighbor cell. That is, the terminal device does not need to receive the time configuration information of the neighbor cell from the network side each time before receiving the time information broadcast by the neighbor cell.

In an embodiment, after the terminal device receives the time configuration information of the neighbor cell, if a measurement gap configured by a current serving cell for the terminal device cannot cover a time domain position indicated by the time configuration information of the neighbor cell, the method 500 further includes: The terminal device sends a measurement gap request message to the serving cell, where the measurement gap request message is used to request a measurement gap of the time domain position at which the neighbor cell broadcasts the time information; and receives measurement gap configuration information from the serving cell, where a measurement gap indicated by the measurement gap configuration information covers the time domain position at which the neighbor cell broadcasts the time information. Operation S510 includes: The terminal device receives, within the measurement gap indicated by the measurement gap configuration information, the second time information broadcast by the neighbor cell.

For example, the measurement gap request message carries information indicating a time domain position of the time information of the neighbor cell.

The measurement gap request message may further carry the cell ID of the neighbor cell.

For another example, the measurement gap request message may carry information about time domain positions of the time information of the plurality of neighbor cells and the cell IDs of the neighbor cells.

It should be further understood that, after the terminal device receives the time configuration information of the neighbor cell, if the measurement gap configured by the current serving cell for the terminal device may cover the time domain position indicated by the time configuration information of the neighbor cell, the terminal device may directly receive, based on the current measurement gap, the time information broadcast by the neighbor cell.

It should be further understood that if the neighbor cell and the serving cell are on a same frequency, the terminal device does not need to receive, by using the measurement gap, the time information broadcast by the neighbor cell. In this case, the serving base station does not need to be requested to configure the measurement gap either.

Figure 7:
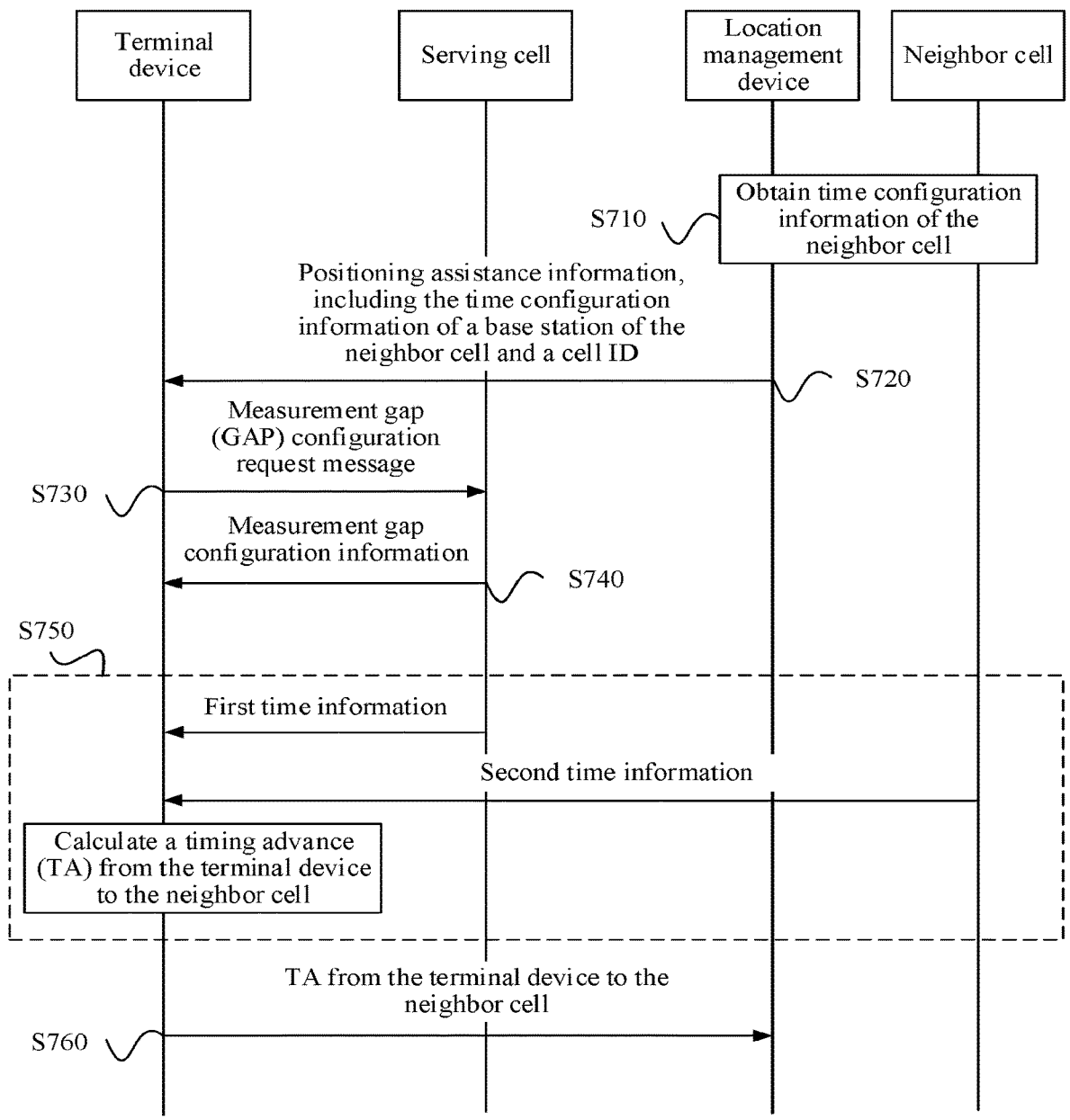
FIG. 7 is another schematic flowchart of a method for obtaining a TA according to an embodiment of the application.

For example, FIG. 7 is a schematic interaction diagram of a method 700 for obtaining a timing advance TA according to an embodiment of the application. The method 700 includes the following operations.

S710: A location management device collects time configuration information of one or more neighbor cells (one neighbor cell shown in FIG. 7).

For example, the location management device may collect time configuration information from a neighbor cell (e.g., a base station of the neighbor cell) participating in positioning of a terminal device.

S720: The location management device sends positioning assistance information to the terminal device, where the positioning assistance information includes the time configuration information of the neighbor cells obtained in operation S710 and corresponding cell IDs.

After receiving the positioning assistance information, the terminal device may learn a time domain position and a frequency domain position at which the one or more neighbor cells broadcast the time information.

S730: If a current measurement gap of the terminal device cannot cover the time domain positions of the time information of the one or more neighbor cells, that is, the current measurement gap cannot satisfy reading of the time information of the one or more neighbor cells, the terminal device sends a measurement gap request message to a serving cell, where the measurement gap request message includes the time configuration information of the one or more neighbor cells and the corresponding cell IDs.

For example, the measurement gap request message may further include cell frequency information of the neighbor cells.

S740: The serving base station sends measurement gap configuration information to the terminal device based on the measurement gap request message, where a measurement gap indicated by the measurement gap configuration information can cover the time domain positions of the time information of the one or more neighbor cells carried in the measurement gap request message.

S750: The terminal device calculates TAs from the terminal device to the neighbor cells.

Operation S750 may be implemented by performing operation S510 and operation S520 described above, where the first cell is the serving cell. For details, refer to the foregoing descriptions, and details are not described herein again.

S760: The terminal device reports the TAs from the terminal device to the neighbor cells obtained in operation S750 to the location management device.

It should be understood that the location management device may calculate distances from the terminal device to the neighbor cells based on the TAs from the terminal device to the neighbor cells, and then may position the terminal device based on geographical locations of the neighbor base stations.

In an embodiment, operation S730 and operation S740 may not be performed.

In an embodiment, the serving base station (e.g., the serving cell) includes a component having a location management function, where for example, the component is the gNB shown in FIG. 3. In this case, both operation S710 and operation S720 are performed by the serving cell.

Based on the foregoing descriptions, in the solutions provided in the application, the time information of the first cell and neighbor cell is received, and the TA from the terminal device to the neighbor cell may be obtained through calculation based on the TA from the terminal device to the first cell and the received time information.

In the positioning scenario shown in FIG. 1, if the base stations participating in positioning include the base station of the neighbor cell, the solution provided in the application is used to learn of the TA from the terminal device to the base station of the neighbor cell, so that a distance from the terminal device to the base station of the neighbor cell may be learned of, and the terminal device may be positioned.

In addition, according to the application, the TA from the terminal device to the neighbor cell can be easily calculated without introducing a new physical quantity. This is a solution with a relatively wide application range.

The foregoing describes the solution for obtaining the TA from the terminal device to the neighbor cell based on broadcast timing. In addition, the application further provides another solution to obtain the TA from the terminal device to the neighbor cell.

Figure 8:
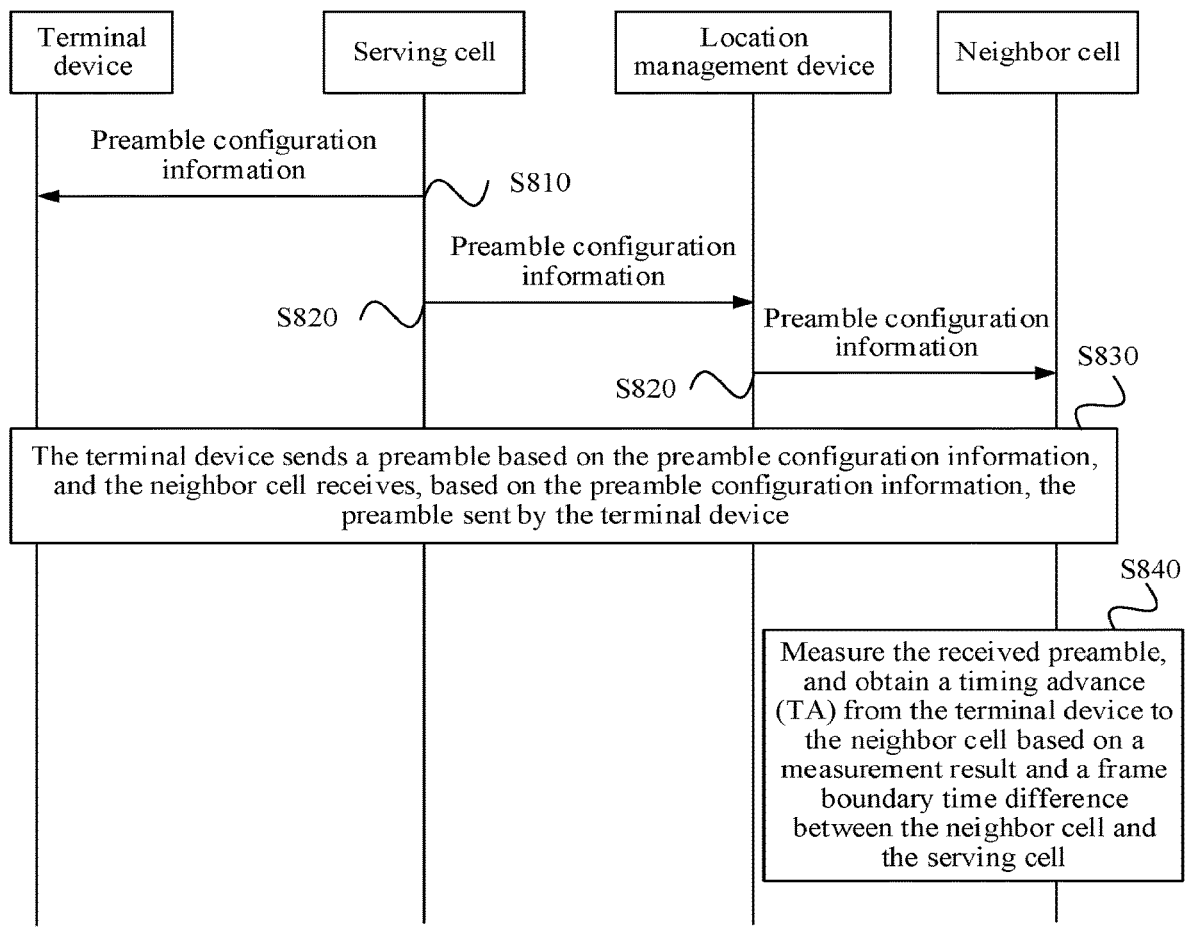
FIG. 8 is still another schematic flowchart of a method for obtaining a TA according to an embodiment of the application.

FIG. 8 is a schematic interaction diagram of a method 800 for obtaining a timing advance TA according to another embodiment of the application. As shown in FIG. 8, the method 800 includes the following operations.

S810: A serving cell configures preamble configuration information for a terminal device, where the preamble configuration information indicates a time-frequency resource used by the terminal device to send a preamble.

For example, the preamble configuration information may include time domain resource configuration information and frequency domain resource configuration information that are used to send the preamble.

For another example, the time-frequency resource that is indicated by the preamble configuration information and that is used by the terminal device to send the preamble may be a random access resource.

In an embodiment, the preamble configuration information may further include sequence information of the preamble.

It should be understood that if a network side and the terminal device agree on the sequence information of the preamble, the preamble configuration information may not carry the sequence information of the preamble.

For example, the serving cell may send the preamble configuration information to the terminal device by using radio resource control (RRC) signaling.

In an embodiment, the preamble indicated by the preamble configuration information may be a dedicated preamble.

In an embodiment, before operation S810, the method may further include: indicating, by the location management device, the serving cell that the TA from the terminal device to the neighbor cell needs to be calculated.

S820: The serving cell sends, to the location management device, the preamble configuration information allocated to the terminal device in operation S810, and the location management device sends the preamble configuration information to a neighbor cell.

The location management device may send the preamble configuration information to one or more neighbor cells.

For example, the location management device may send the preamble configuration information to a neighbor cell participating in positioning of the terminal device.

S830: The terminal device sends the preamble based on the preamble configuration information, and the neighbor cell receives, based on the preamble configuration information, the preamble sent by the terminal device.

It should be noted that the neighbor cell receives, on the time-frequency resource indicated by the preamble configuration information, only the preamble sent by the terminal device. In other words, on the time-frequency resource indicated by the preamble configuration information, the neighbor cell does not perform signal transmission for another terminal device.

S840: The neighbor cell measures the received preamble, and obtains a TA from the terminal device to the neighbor cell based on a measurement result and a frame boundary time difference between the neighbor cell and the serving cell.

The frame boundary time difference between the neighbor cell and the serving cell indicates a frame boundary timing difference between the neighbor cell and the serving cell, for example, t1 shown in FIG. 6.

The neighbor cell may independently obtain the frame boundary time difference between the neighbor cell and the serving cell.

Alternatively, the serving cell or the location management device sends the frame boundary time difference between the neighbor cell and the serving cell to the neighbor cell.

For example, a method for calculating a frame boundary time difference between two cells is as follows: First, a global positioning system (GPS) is configured on a base station in each of the two cells, and the frame boundary time difference between the two cells can be calculated by using GPS measurement results of the base stations in the two cells. A method for determining a frame boundary time difference between cells is not limited in the application.

In an embodiment, the method may further include: The neighbor cell sends, to the location management device, the TA from the terminal device to the neighbor cell that is obtained in operation S840.

It should be understood that the location management device may calculate a distance from the terminal device to the neighbor cell based on the TA from the terminal device to the neighbor cell, and then may position the terminal device based on a geographical location of a neighbor base station.

According to the solution in the embodiment shown in FIG. 8 of the application, the serving cell sends the preamble configuration information to the terminal device and the neighbor cell, so that the neighbor cell may obtain the TA from the terminal device to the neighbor cell by receiving and measuring the preamble sent by the terminal device.

It should be understood that operation S810 and operation S820 may be performed only once.

For example, after receiving the preamble configuration information for the first time, the terminal device and the neighbor cell may locally cache the preamble configuration information. In a subsequent signal transmission process based on the preamble configuration information, the preamble configuration information may be directly used to send the preamble (on the terminal device side) and receive the preamble (on the neighbor cell side). That is, the serving cell does not need to send the preamble configuration information to the terminal device and the neighbor cell each time before the preamble is transmitted.

In an embodiment, the serving base station (e.g., the serving cell) includes a component having a location management function, for example, the gNB shown in FIG. 3. In this case, operation S820 may be performed by the serving cell.

In an embodiment, as shown in FIG. 8, the method further includes: The serving cell receives, based on the preamble configuration information, the preamble sent by the terminal device, and determines, based on measurement of the preamble, a TA from the terminal device to the serving cell.

In this embodiment, the serving cell allocates the preamble configuration information to the terminal device, and sends the preamble configuration information to the terminal device and the neighbor cell. The terminal device sends the preamble based on the preamble configuration information, and the serving cell and the neighbor cell receive the preamble based on the preamble configuration information.

In this embodiment, both the serving cell and the neighbor cell may send their respective TAs to the location management device. The location management device may obtain a distance from the terminal device to the serving cell based on the TA of the serving cell, obtain a distance from the terminal device to the neighbor cell based on the TA of the neighbor cell, and then position the terminal device with reference to geographical locations of the serving cell and the neighbor cell.

Figure 9:
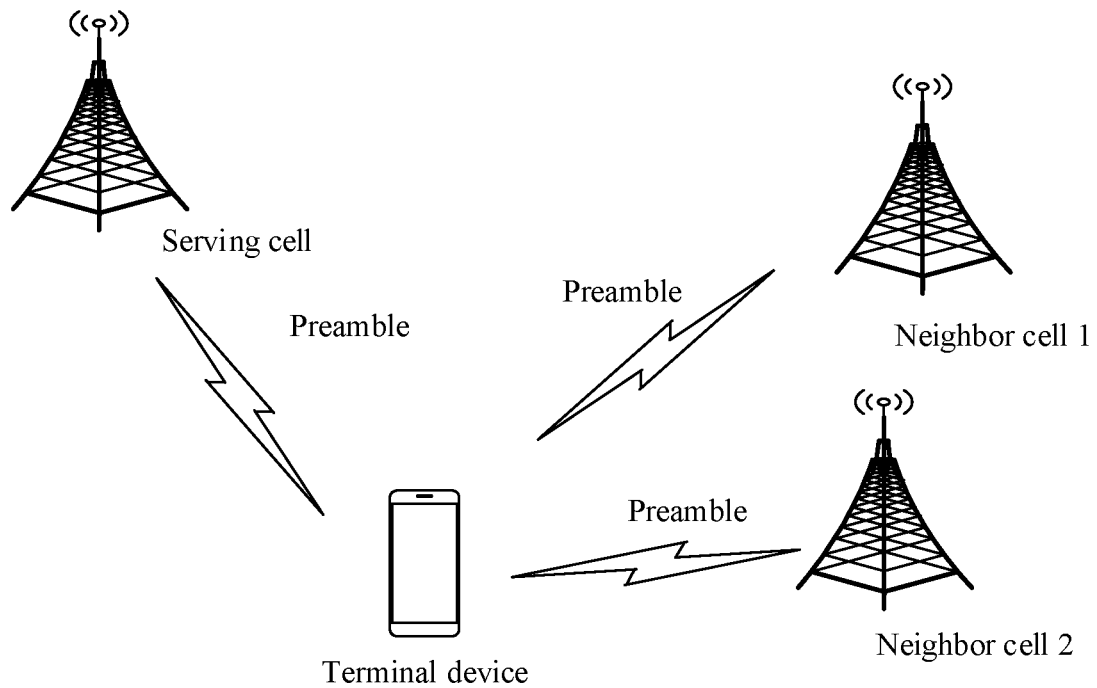
FIG. 9 is a schematic diagram of a method for obtaining a TA of a neighbor cell based on a preamble according to an embodiment of the application.

For example, as shown in FIG. 9, a serving cell, a neighbor cell 1, and a neighbor cell 2 participate in positioning of a terminal device. The serving cell allocates preamble configuration information to the terminal device, and sends the preamble configuration information to the terminal device, the neighbor cell 1, and the neighbor cell 2. The terminal device sends a preamble based on the preamble configuration information, and the serving cell, the neighbor cell 1, and the neighbor cell 2 receive the preamble based on the preamble configuration information. The three cells may obtain their respective TAs by measuring the preamble. The serving cell, the neighbor cell 1, and the neighbor cell 2 send their respective TAs to a location management device. The location management device calculates distances from the terminal device to the serving cell, the neighbor cell 1, and the neighbor cell 2 separately based on the TAs of the serving cell, the neighbor cell 1, and the neighbor cell 2. The terminal device may be positioned based on the distances from the terminal device to the serving cell, the neighbor cell 1, and the neighbor cell 2, and geographical locations of the serving cell, the neighbor cell 1, and the neighbor cell 2.

In an embodiment, the preamble in the embodiment described with reference to FIG. 8 may be replaced with an uplink reference signal. For example, the uplink reference signal may be any one of the following:

a sounding reference signal (SRS), a demodulation reference signal (DMRS), a channel quality indicator (CQI), a physical uplink shared channel (PUSCH), or the like.

It should be further understood that, in addition to being used in the positioning solution of the terminal device shown in FIG. 1, the solution for obtaining the TA from the terminal device to the neighbor cell provided in the application may be used in another scenario in which a TA from the terminal device to a base station of the neighbor cell needs to be obtained.

It should be further understood that, the first, second, and various numbers included in the application are merely distinguished for convenient description, and are not intended to limit the scope of the embodiments of the application.

The embodiments described in the application may be independent solutions, or may be combined based on internal logic. All these solutions fall within the protection scope of the application.

It may be understood that, in the foregoing method embodiments, the methods and the operations performed by the terminal device may also be performed by a component (for example, a chip or a circuit) that may be used in the terminal device, and the methods and the operations performed by the location management device may also be performed by a component (for example, a chip or a circuit) that may be used in the location management device.

The foregoing describes the method embodiments provided in the embodiments of the application, and the following describes apparatus embodiments provided in the embodiments of the application. It should be understood that descriptions of the apparatus embodiments are corresponding to the descriptions of the method embodiments. Therefore, for content that is not described in detail, refer to the foregoing method embodiments. For brevity, details are not described herein again.

The foregoing mainly describes, in terms of interaction between various devices, the solutions provided in the embodiments of the application. It may be understood that, to perform the foregoing functions, each device, such as a transmit end device or a receive end device, includes a corresponding hardware structure and/or software module for performing each function. One of ordinary skill in the art may be aware that with reference to units and algorithm operations in the examples described in the embodiments disclosed in the application, the methods described herein can be performed by electronic hardware or a combination of computer software and electronic hardware. Whether a function is performed by hardware or hardware driven by computer software depends on particular applications and design constraint conditions of the technical solutions. One of ordinary skill in the art may use different methods to perform the described functions for a particular application, but it should not be considered that the implementation goes beyond the scope of the application.

In the embodiments of the application, a transmit end device or a receive end device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of the application is an example, and is merely a logical function division. During actual implementation, another division manner may be used. An example in which each function module is obtained through division based on a corresponding function is used below for description.

Figure 10:
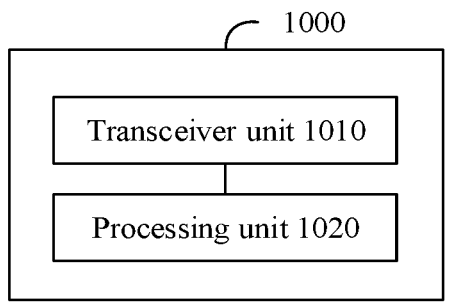
FIG. 10 is a schematic block diagram of a communication device according to an embodiment of the application.

FIG. 10 is a schematic block diagram of a communication device 1000 according to an embodiment of the application. The communication device 1000 includes a transceiver unit 1010 and a processing unit 1020. The transceiver unit 1010 may communicate with the outside, and the processing unit 1020 is configured to process data. The transceiver unit 1010 may also be referred to as a communication interface or a communication unit.

The communication device 1000 may be configured to perform an action performed by the terminal device in the foregoing method embodiments, or an action performed by the neighbor cell in the foregoing method embodiments, or an action performed by the serving cell in the foregoing method embodiments, or an action performed by the location management device in the foregoing method embodiments.

In an embodiment, the communication device 1000 may be configured to perform the action performed by the terminal device in the foregoing method embodiments. In an embodiment, the communication device 1000 may be referred to as a terminal device. The transceiver unit 1010 is configured to perform operations related to receiving and sending on the terminal device side in the foregoing method embodiments, and the processing unit 1020 is configured to perform operations related to processing on the terminal device in the foregoing method embodiments.

In an embodiment, the transceiver unit 1010 is configured to: receive first time information broadcast by a first cell, and receive second time information broadcast by a neighbor cell. The processing unit 1020 is configured to obtain a timing advance TA from the terminal device to the neighbor cell based on the following information: a time point indicated by the first time information, a TA from the terminal device to the first cell, a time difference between receiving of the first time information and receiving of the second time information, and a time point indicated by the second time information.

In an embodiment, the first cell is a serving cell.

In an embodiment, the transceiver unit 1010 is configured to: receive positioning assistance information from the serving cell or a location management device, where the positioning assistance information includes time configuration information of the neighbor cell, and the time configuration information is used to indicate a time-frequency resource used by the neighbor cell to broadcast the time information; and receive, based on the time configuration information, the second time information broadcast by the neighbor cell.

In an embodiment, the transceiver unit 1010 is further configured to: send a measurement gap request message to the serving cell, where the measurement gap request message is used to request a measurement gap covering a time domain position at which the neighbor cell broadcasts the time information; and receive measurement gap configuration information from the serving cell, where a measurement gap indicated by the measurement gap configuration information covers the time domain position at which the neighbor cell broadcasts the time information. The transceiver unit 1010 is configured to receive, within the measurement gap indicated by the measurement gap configuration information, the second time information broadcast by the neighbor cell.

In another embodiment, the communication device 1000 may be configured to perform the action performed by the neighbor cell in the foregoing method embodiments. In an embodiment, the communication device 1000 may be referred to as a neighbor cell or a network device in the neighbor cell. The transceiver unit 1010 is configured to perform operations related to receiving and sending on the neighbor cell in the foregoing method embodiments, and the processing unit 1020 is configured to perform operations related to processing on the neighbor cell in the foregoing method embodiments.

In an embodiment, the transceiver unit 1010 is configured to: receive preamble configuration information, where the preamble configuration information indicates a time-frequency resource used by a terminal device to send a preamble; and receive, based on the preamble configuration information, the preamble sent by the terminal device. The processing unit 1020 is configured to: measure the received preamble, and obtain a timing advance TA from the terminal device to the neighbor cell based on a measurement result and a frame boundary time difference between the neighbor cell and a serving cell.

In an embodiment, the transceiver unit 1010 is configured to receive the preamble configuration information from the serving cell or a location management device.

In an embodiment, the transceiver unit 1010 is further configured to receive a frame boundary time difference between the neighbor cell and the serving cell from the serving cell or the location management device.

It should be understood that the processing unit 1020 in the foregoing embodiment may be implemented by a processor or a processor-related circuit, and the transceiver unit 1010 may be implemented by a transceiver or a transceiver-related circuit.

Figure 11:
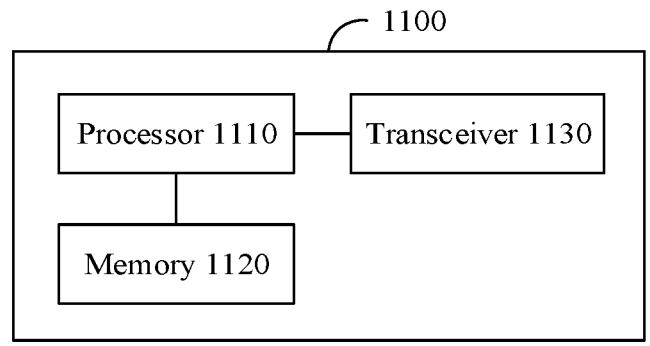
FIG. 11 is another schematic block diagram of a communication device according to an embodiment of the application.

As shown in FIG. 11, an embodiment of the application further provides a communication device 1100. The communication device 1100 includes a processor 1110, a memory 1120, and a transceiver 1130. The memory 1120 stores a program. The processor 1110 is configured to execute the program stored in the memory 1120. Execution of the program stored in the memory 1120 enables the processor 1110 to perform related processing operations in the foregoing method embodiments, and enables the processor 1110 to control the transceiver 1130 to perform operations related to receiving and sending in the foregoing method embodiments.

In an embodiment, the communication device 1100 is configured to perform an action performed by the terminal device in the foregoing method embodiments. In this case, the execution of the program stored in the memory 1120 enables the processor 1110 to perform the processing operations on the terminal device side in the foregoing method embodiments. The transceiver 1130 is configured to perform the receiving and sending operations on the terminal device side in the foregoing method embodiments. In an embodiment, the execution of the program stored in the memory 1120 enables the processor 1110 to control the transceiver 1130 to perform the receiving and sending operations on the terminal device side in the foregoing method embodiments.

In another embodiment, the communication device 1100 is configured to perform an action performed by the neighbor cell in the foregoing method embodiments. In this case, the execution of the program stored in the memory 1120 enables the processor 1110 to perform the processing operations on the neighbor cell side in the foregoing method embodiments. The transceiver 1130 is configured to perform the receiving and sending operations on the neighbor cell side in the foregoing method embodiments. In an embodiment, the execution of the program stored in the memory 1120 enables the processor 1110 to control the transceiver 1130 to perform the receiving and sending operations on the neighbor cell side in the foregoing method embodiments.

In still another embodiment, the communication device 1100 is configured to perform an action performed by the serving cell in the foregoing method embodiments. In this case, the execution of the program stored in the memory 1120 enables the processor 1110 to perform the processing operations on the serving cell side in the foregoing method embodiments. The transceiver 1130 is configured to perform the receiving and sending operations on the serving cell side in the foregoing method embodiments. In an embodiment, the execution of the program stored in the memory 1120 enables the processor 1110 to control the transceiver 1130 to perform the receiving and sending operations on the serving cell side in the foregoing method embodiments.

In yet another embodiment, the communication device 1100 is configured to perform an action performed by the location management device in the foregoing method embodiments. In this case, the execution of the program stored in the memory 1120 enables the processor 1110 to perform the processing operations on the location management device side in the foregoing method embodiments. The transceiver 1130 is configured to perform the receiving and sending operations on the location management device side in the foregoing method embodiments. In an embodiment, the execution of the program stored in the memory 1120 enables the processor 1110 to control the transceiver 1130 to perform the receiving and sending operations on the location management device side in the foregoing method embodiments.

An embodiment of the application further provides a communication apparatus 1200. The communication apparatus 1200 may be a terminal device or a chip. The communication device 1200 may be configured to perform an action performed by the terminal device in the foregoing method embodiments.

Figure 12:
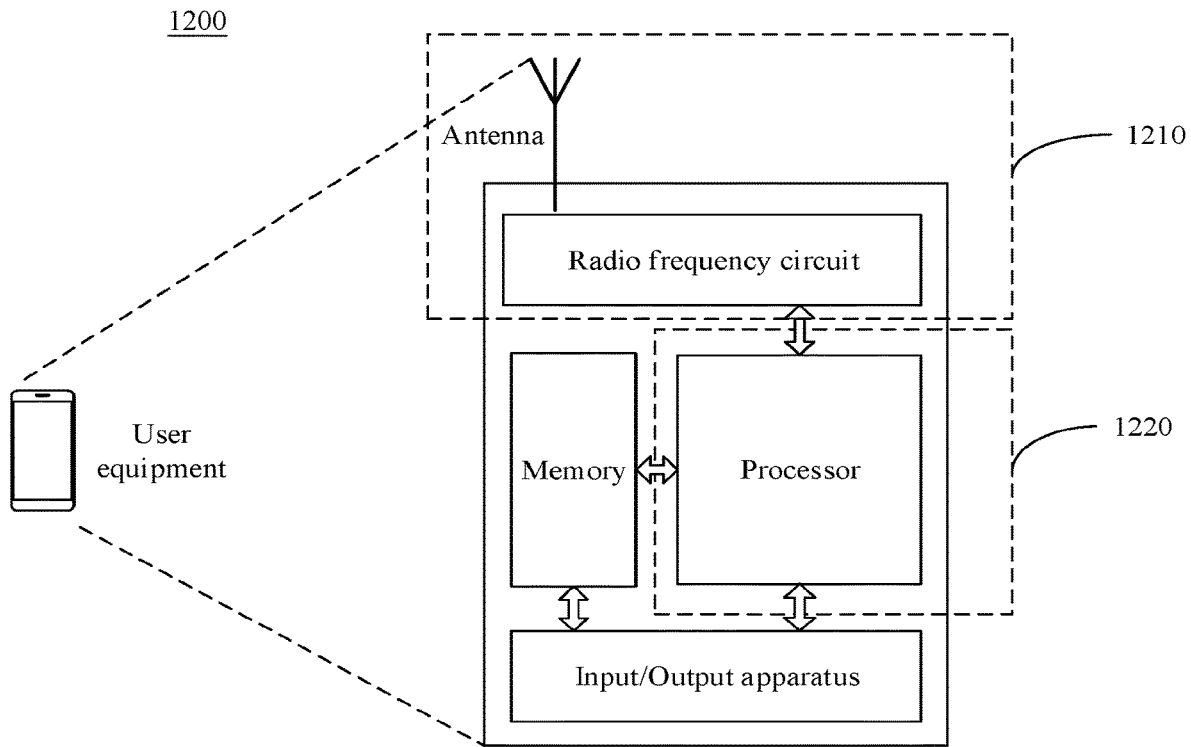
FIG. 12 is a schematic block diagram of a terminal device according to an embodiment of the application.

When the communication device 1200 is a terminal device, FIG. 12 is a simplified schematic diagram of a structure of the terminal device. For ease of understanding and illustration, in FIG. 12, user equipment, such as a mobile phone, is used as an example of the terminal device. As shown in FIG. 12, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of the application.

In this embodiment of the application, the antenna and the radio frequency circuit that have receiving and sending functions may be considered as a transceiver unit of the terminal device, and the processor that has a processing function may be considered as a processing unit of the terminal device.

For example, as shown in FIG. 12, the antenna and the radio frequency circuit that have receiving and sending functions are denoted as a transceiver unit 1210, and the processor that has a processing function is denoted as a processing unit 1220. That is, the terminal device includes the transceiver unit 1210 and the processing unit 1220. The transceiver unit 1210 may also be referred to as a transceiver, a transceiver machine, a transceiver apparatus, or the like. The processing unit 1220 may also be referred to as a processor, a processing board, a processing module, a processing apparatus, or the like. In an embodiment, a component for performing the receiving function in the transceiver unit 1210 may be considered as a receiving unit, and a component for performing the sending function in the transceiver unit 1210 may be considered as a sending unit. That is, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

In an embodiment, the transceiver unit 1210 is further configured to perform the receiving operation on the terminal device side in operation S510 shown in FIG. 5, and/or the transceiver unit 1210 is further configured to perform other receiving and sending operations on the terminal device side. The processing unit 1220 is configured to perform operation S520 shown in FIG. 5, and/or the processing unit 1220 is further configured to perform other processing operations on the terminal device side.

In another embodiment, the transceiver unit 1210 is further configured to perform the receiving operations on the terminal device side in operations S720, S740, and S750 shown in FIG. 7. The transceiver unit 1210 is further configured to perform the sending operations on the terminal device side in operations S730 and S760 shown in FIG. 7, and/or the transceiver unit 1210 is further configured to perform other receiving and sending operations on the terminal device side. The processing unit 1220 is configured to perform operation S750 shown in FIG. 7, and/or the processing unit 1220 is further configured to perform other processing operations on the terminal device side.

In still another embodiment, the transceiver unit 1210 is further configured to perform the receiving operation on the terminal device side in operation S810 shown in FIG. 8. The transceiver unit 1210 is further configured to perform the sending operation on the terminal device side in operation S830 shown in FIG. 8, and/or the transceiver unit 1210 is further configured to perform other receiving and sending operations on the terminal device side. The processing unit 1220 is configured to perform the processing operation on the terminal device side in operation S830 shown in FIG. 8, for example, determine, based on preamble configuration information, a time-frequency resource used to send a preamble, and/or the processing unit 1220 is further configured to perform other processing operations on the terminal device side.

It should be understood that FIG. 12 is merely an example instead of a limitation. The terminal device including the transceiver unit and the processing unit may not depend on the structure shown in FIG. 12.

When the communication device 1200 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of the application further provides a communication device 1300. The communication device 1300 may be a network device or a chip. The communication device 1300 may be configured to perform an action performed by the neighbor cell in the foregoing method embodiments, or an action performed by the serving cell in the foregoing method embodiments, or an action performed by the location management device in the foregoing method embodiments.

Figure 13:
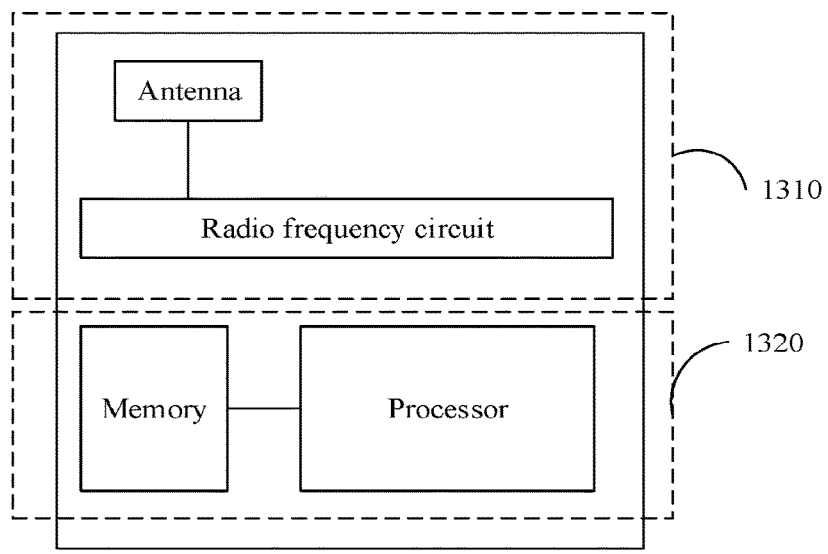
FIG. 13 is a schematic block diagram of a network device according to an embodiment of the application.

When the communication device 1300 is a network device, for example, a base station, FIG. 13 is a simplified schematic diagram of a structure of the base station. The base station includes a part 1310 and a part 1320. The part 1310 is mainly configured to: send and receive a radio frequency signal, and perform conversion between the radio frequency signal and a baseband signal. The part 1320 is mainly configured to: perform baseband processing, control the base station, and so on. The part 1310 may be usually referred to as a transceiver unit, a transceiver machine, a transceiver circuit, a transceiver, or the like. The part 1320 is usually a control center of the base station, and may be usually referred to as a processing unit, and is configured to control the base station to perform a processing operation on the network device side in the foregoing method embodiments.

The transceiver unit in the part 1310 may also be referred to as a transceiver machine, a transceiver, or the like. The transceiver unit includes an antenna and a radio frequency unit. The radio frequency unit is mainly configured to perform radio frequency processing. In an embodiment, a component for performing a receiving function in the part 1310 may be considered as a receiving unit, and a component for performing a sending function may be considered as a sending unit. That is, the part 1310 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1320 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an embodiment, the plurality of boards may share one or more processors, or the plurality of boards may share one or more memories, or the plurality of boards may simultaneously share one or more processors.

In an embodiment, the transceiver unit in the part 1310 is configured to perform the sending operations on the neighbor cell side in operation S710 and S750 in FIG. 7, and/or the transceiver unit in the part 1310 is further configured to perform other receiving and sending operations on the neighbor cell side in the embodiments of the application. The processing unit in the part 1320 is configured to perform a processing operation on the neighbor cell side in the embodiments of the application.

In another embodiment, the transceiver unit in the part 1310 is configured to perform the receiving operations on the neighbor cell side in operation S820 and S830 in FIG. 8, and/or the transceiver unit in the part 1310 is further configured to perform other receiving and sending operations on the neighbor cell side in the embodiments of the application. The processing unit in the part 1320 is configured to perform operation S840 in FIG. 8.

In still another embodiment, the transceiver unit in the part 1310 is configured to perform the sending operations on the serving cell side in operations S740 and S750 in FIG. 7, the transceiver unit in the part 1310 is configured to perform the receiving operation on the serving cell side in operation S730 in FIG. 7, and/or the transceiver unit in the part 1310 is further configured to perform other receiving and sending operations on the serving cell side in the embodiments of the application. The processing unit in the part 1320 is configured to perform a processing operation on the serving cell side in the embodiments of the application.

In yet another embodiment, the transceiver unit in the part 1310 is configured to perform the sending operations on the serving cell side in operation S810 and S820 in FIG. 8, and/or the transceiver unit in the part 1310 is further configured to perform other receiving and sending operations on the serving cell side in the embodiments of the application. The processing unit in the part 1320 is configured to perform a processing operation on the serving cell side in the embodiments of the application.

It should be understood that FIG. 13 is merely an example instead of a limitation. The network device including the transceiver unit and the processing unit may not depend on the structure shown in FIG. 13.

When the communication device 1300 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of the application further provides a communication system. The communication system includes the location management device, the serving cell, the neighbor cell, and the terminal device in the foregoing embodiments.

An embodiment of the application further provides a computer-readable storage medium. The computer-readable storage medium stores a computer program. When the computer program is executed by a computer, the computer is enabled to perform the method on the terminal device side, the method on the neighbor cell side, the method on the serving cell side, or the method on the location management device side, in the foregoing method embodiments.

An embodiment of the application further provides a computer program product including instructions. When the instructions are executed by a computer, the computer is enabled to perform the method on the terminal device side, the method on the neighbor cell side, the method on the serving cell side, or the method on the location management device side, in the foregoing method embodiments.

For explanations and beneficial effects of related content of any of the communication apparatuses provided above, refer to the corresponding method embodiment provided above, and details are not described herein again.

In the embodiments of the application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of the methods provided in the embodiments of the application is not limited in the embodiments of the application, provided that a program that records code of the methods provided in the embodiments of the application can be run to perform communication based on the methods provided in the embodiments of the application. For example, the methods in the embodiments of the application may be performed by the terminal device or the network device, or a function module that can invoke and execute the program in the terminal device or network device.

In addition, aspects or features of the application may be implemented as a method, an apparatus, or a product that uses standard programming and/or engineering technologies. The term "product" used in the application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in the application may represent one or more devices and/or other machine-readable media that are configured to store information. The term "machine-readable media" may include but is not limited to a radio channel and various other media that can store, include, and/or carry instructions and/or data.

It should be understood that, the processor mentioned in the embodiments of the application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of the application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, or another programmable logic device, discrete gate or transistor logic device, or discrete hardware component, the memory (e.g., a storage module) is integrated into the processor.

It should be noted that the memory described in the application includes but is not limited to the foregoing memory, and further includes any memory of another proper type.

One of ordinary skill in the art may be aware that, in combination with the examples described in the embodiments disclosed in the application, units and algorithm operations may be implemented by electronic hardware or a combination of computer software and electronic hardware. Whether the functions are performed by hardware or software depends on particular applications and design constraint conditions of the technical solutions. One of ordinary skill in the art may use different methods to implement the described functions for each particular application, but it should not be considered that the implementation goes beyond the scope of the application.

It may be clearly understood by one of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided in the application, it should be understood that the provided system, apparatus, and method may be implemented in other manners. For example, the apparatus embodiments described above are merely examples. For example, the unit division described above is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on actual requirements to achieve technical effects of the solutions in the embodiments.

In addition, function units in the embodiments of the application may be integrated into one processing unit, or each of the units may exist alone physically, or two or more units may be integrated into one unit.

When the foregoing functions are implemented in the form of a software function unit and sold or used as an independent product, the functions may be stored in a computer-readable storage medium. Based on such an understanding, the technical solutions of the application essentially, or the part contributing to an existing technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of the application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the application, but are not intended to limit the protection scope of the application. Any variation or replacement readily figured out by one of ordinary skill in the art within the technical scope disclosed in the application shall fall within the protection scope of the application. Therefore, the protection scope of the application shall be subject to the protection scope of the claims.

What is claimed is:

1. A method for obtaining a timing advance (TA), comprising:
    sending a measurement gap request message to a serving cell, wherein the measurement gap request message is used to request a measurement gap covering a time domain position at which a neighbor cell broadcasts second time information;
    receiving measurement gap configuration information from the serving cell, wherein a measurement gap indicated by the measurement gap configuration information covers the time domain position at which the neighbor cell broadcasts the second time information;
    receiving, by a terminal device, first time information broadcast by a first cell, wherein the first cell is a serving base station, and receiving the second time information broadcast by the neighbor cell, wherein the neighbor cell is a neighbor base station; and
    obtaining a TA from the terminal device to the neighbor cell based on: a time point indicated by the first time information, a TA from the terminal device to the first cell, a time difference between receiving of the first time information and receiving of the second time information, and a time point indicated by the second time information.

2. The method according to claim 1, wherein the receiving second time information broadcast by the neighbor cell comprises:
    receiving positioning assistance information from the serving cell or a location management device, wherein the positioning assistance information comprises time configuration information of the neighbor cell, and wherein the time configuration information is used to indicate a time-frequency resource used by the neighbor cell to broadcast the second time information; and
    receiving, based on the time configuration information, the second time information broadcast by the neighbor cell.

3. The method according to claim 1,
the second time information broadcast by the neighbor cell is received
within the measurement gap indicated by the measurement gap configuration information.

4. The method according to claim 1, wherein the first cell is the serving cell.

5. A method for obtaining a timing advance (TA), comprising:
receiving, by a neighbor cell, preamble configuration information, wherein the preamble configuration information indicates a time-frequency resource used by a terminal device to send a preamble;
receiving, based on the preamble configuration information, the preamble sent by the terminal device;
measuring the received preamble, and
obtaining a TA from the terminal device to the neighbor cell based on a measurement result and a frame boundary time difference between the neighbor cell and a serving cell.

6. The method according to claim 5, wherein the preamble configuration information is received from the serving cell or a location management device.

7. The method according to claim 5, further comprising:
receiving, by the neighbor cell, the frame boundary time difference between the neighbor cell and the serving cell from the serving cell or a location management device.

8. A terminal device, comprising:
a transceiver unit configured to: send a measurement gap request message to a serving cell, wherein the measurement gap request message is used to request a measurement gap covering a time domain position at which the neighbor cell broadcasts second time information; receive measurement gap configuration information from the serving cell, wherein a measurement gap indicated by the measurement gap configuration information covers the time domain position at which the neighbor cell broadcasts the second time information; receive first time information broadcast by a first cell, wherein the first cell is a serving base station, and receive the second time information broadcast by the neighbor cell, wherein the neighbor cell is a neighbor base station; and
a processing unit configured to: obtain a timing advance (TA) from the terminal device to the neighbor cell based on: a time point indicated by the first time information, a TA from the terminal device to the first cell, a time difference between receiving of the first time information and receiving of the second time information, and a time point indicated by the second time information.

9. The terminal device according to claim 8, wherein the transceiver unit is further configured to:
receive positioning assistance information from the serving cell or a location management device, wherein the positioning assistance information comprises time configuration information of the neighbor cell, and the time configuration information is used to indicate a time-frequency resource used by the neighbor cell to broadcast the second time information; and
receive, based on the time configuration information, the second time information broadcast by the neighbor cell.

10. The terminal device according to claim 8, wherein
the transceiver unit is configured to receive, within the measurement gap indicated by the measurement gap configuration information, the second time information broadcast by the neighbor cell.

11. The terminal device according to claim 8, wherein the first cell is the serving cell.

12. A network device in a neighbor cell, comprising:
a transceiver unit configured to:
receive preamble configuration information, wherein the preamble configuration information indicates a time-frequency resource used by a terminal device to send a preamble; and
receive, based on the preamble configuration information, the preamble sent by the terminal device; and
a processing unit configured to: measure the received preamble, and obtain a timing advance (TA) from the terminal device to the neighbor cell based on a measurement result and a frame boundary time difference between the neighbor cell and a serving cell.

13. The network device according to claim 12, wherein the transceiver unit is configured to receive the preamble configuration information from the serving cell or a location management device.

14. The network device according to claim 12, wherein the transceiver unit is further configured to receive the frame boundary time difference between the neighbor cell and the serving cell from the serving cell or a location management device.

* * * * *